United States Patent [19]
Ellgoth et al.

[11] Patent Number: 5,303,739
[45] Date of Patent: Apr. 19, 1994

[54] FRESH WATER SUPPLY SYSTEM FOR AN AIRCRAFT

[75] Inventors: Hubert Ellgoth; Helge Frank, both of Hamburg; Gerd Grunwald, Neuenkirchen; Georg Mai, Bremen; Karolin Mau; Ralf Schliwa, both of Hamburg, all of Fed. Rep. of Germany

[73] Assignee: Deutsche Aerospace Airbus GmbH, Hamburg, Fed. Rep. of Germany

[21] Appl. No.: 954,898

[22] Filed: Sep. 30, 1992

[30] Foreign Application Priority Data

Sep. 30, 1991 [DE] Fed. Rep. of Germany ....... 4132491
Aug. 20, 1992 [DE] Fed. Rep. of Germany ....... 4227518

[51] Int. Cl.⁵ .............................................. E03B 7/07
[52] U.S. Cl. .................................. 137/899.2; 137/209; 137/341; 137/563; 137/624.14
[58] Field of Search ............... 137/209, 563, 565, 334, 137/341, 624.12, 624.13, 624.14, 899, 899.2

[56] References Cited

U.S. PATENT DOCUMENTS

| | | | |
|---|---|---|---|
| 3,643,678 | 2/1972 | Genrich | 137/209 |
| 3,870,228 | 3/1975 | Mosely, Jr. | 137/563 |
| 3,876,107 | 4/1975 | Meindl et al. | 137/209 |
| 4,239,054 | 12/1980 | Van Riyn | 137/209 |
| 4,291,720 | 9/1981 | Folland | 137/209 |

*Primary Examiner*—A. Michael Chambers
*Attorney, Agent, or Firm*—W. G. Fasse; W. F. Fasse

[57] ABSTRACT

A fresh water supply system for an aircraft has at least one supply tank connected to one or more water taps or faucets through a main line, including a device for conveying the water, for example by a pump, by suction, by pressure, or even by gravity. An auxiliary tank or reservoir is arranged near a tap or faucet, and the auxiliary tank is connected to the main line by a controllable valve. The conveying device is connected with a control, which operates in such a way that the main line is filled with water only during first time durations while it is filled with air during second time durations. A venting valve is connected to the main line to permit the venting of the main line when water is removed from the main line. Air also escapes through the venting valve when the main line is being refilled with water.

9 Claims, 6 Drawing Sheets

FRESH WATER SUPPLY SYSTEM FOR AN AIRCRAFT

FIELD OF THE INVENTION

The invention relates to a fresh water supply system in an aircraft. Such systems comprise at least one fresh water supply tank connected to at least one water tap by a main line. The main line is connected to a conveying device, such as a pump or suction device.

BACKGROUND INFORMATION

Water distribution systems of the just mentioned type are known in commercial aircraft in order to supply hand wash basins in toilets and sinks in onboard kitchens with fresh water. Frequently fresh water is also used for flushing toilet basins. Water that has been used in a hand wash basin and in a kitchen sink becomes waste water and is conventionally discharged from the aircraft into the environment. However, sewage is collected in a waste water tank which may also receive used waste water. Normally, the discharge of waste water takes place with the aid of reduced pressure creating a suction effect in the toilet facilities for conveying the sewage to the collection tank.

Conventional fresh water supply systems have the disadvantage that the supply tank or tanks are connected to the respective facilities by a one-way main line. The term "line" as used herein is intended to cover any suitable pipe or duct. A one-way main line is always filled with water even when water is not used. Further, these lines, as a rule, are installed in the or near to the aircraft bottom that separates a freight space from a passenger cabin.

As a result, the line is exposed to a cold environment, especially when the aircraft is travelling at high elevations. As a result, freeze-up of the water supply lines is possible, unless the lines are heated, for example by electrical heating elements installed in parallel to the water lines. This type of construction is involved and expensive in its manufacture and installation.

It is also conventional to provide these water lines with a continuous inclination for draining the system by gravity flow. Inclined lines cause difficulties when a basic aircraft type is modified to produce a shorter or longer version of the basic type. In both instances substantial problems arise in installing the lines with the required inclination. In these instances assuring the required line inclinations makes it necessary to redesign the line installation with due regard to the available structural length of the aircraft, or rather the length available for the line installation.

OBJECTS OF THE INVENTION

In view of the foregoing, it is the aim of the invention to achieve the following objects singly or in combination:

to simplify a fresh water supply system of the type described above in an aircraft in such a way that it is less dependent on the available installation length and that its manufacture, installation and operation will be more cost efficient than heretofore;

to avoid keeping the lines filled at all times, thereby also avoiding the need for heating those sections of the lines that are exposed to freezing temperatures;

to provide a valve in the system in such a way that the system may be refilled with water or air; and to make sure that a rapid venting and refilling of the system, including the supply tank or tanks is possible.

SUMMARY OF THE INVENTION

A fresh water supply system according to the invention, for an aircraft, is characterized in that a fresh water auxiliary tank is arranged in the vicinity of a water tap, such as a hand wash basin or a kitchen sink in an aircraft. The auxiliary tank is connected through a controllable valve with the main line. The water conveying device, such as one or more pumps or suction devices, is connected to a control unit which makes sure that water is flowing through the main line only at certain first time intervals or durations, and that during second time intervals or durations between said first time durations, a venting valve is so controlled, that the main line is vented and thus filled with air. Accordingly, the main line is filled with water only during the first time durations.

By arranging an auxiliary fresh water supply tank in the vicinity of a water tap, it is possible to maintain the water flow through the main line only during predetermined time durations while the main line is empty of water during inbetween time durations, whereby freeze-up is avoided As a result, it is no longer necessary to equip the main line with heating elements, because there is no standing water in the main line and hence the main line cannot freeze up. The venting valve makes sure that air in the main line can rapidly escape when the main line is being refilled with water. Similarly, the venting valve also assures a rapid reentry of air into the main line when water is drained from the main line. A correspondingly dimensioned venting valve assures a complete emptying of the main line with little energy expenditure.

However, it may be desirable to provide a small heater in the vicinity of the main supply tank, rather than providing electrical heaters all along the main line. Such a small heater will preheat the water sufficiently to prevent the formation of ice crystals when the water reenters cold sections of the main line. Instead of slightly preheating the main supply tank, it is possible to pass hot air through the main line prior to refilling with water.

In a preferred embodiment the water conveying device is a pump driven by an electric motor, whereby the pump and motor are so constructed, that they can operate in either direction. Instead of a pump, it is possible to connect the main line to a pressure device that can supply excess pressure or reduced pressure to the main line. Certain sections of the main line may be installed to provide gravity flow for the water.

In order to assure a uniform flow direction of the water even when the main line is filled with water only during certain times, at least portions of the main line are preferably constructed as a ring conduit.

According to a further preferred embodiment of the invention the control valve and the venting valve are combined as a single valve which is arranged in the vicinity of a water tap, whereby the combination valve permits the feeding either of water or pressurized air into the main line.

However, a branch line connecting a water tap to the main line, can also be efficiently emptied without the feeding of pressurized air into the tap line, by connecting the tap line or lines through a respective valve or valves to a reduced pressure or suction device.

In order to minimize the refilling duration during flight, a certain minimum water level in at least one of the auxiliary water tanks is ascertained or sensed to provide a respective control signal for refilling the auxiliary tanks to maintain a certain minimum water level in the auxiliary tank or tanks.

An especially compact embodiment of the supply system according to the invention is provided when the above mentioned two valves are combined to provide the function of the main control valve and the venting function in a single valve that is connected to the main line for selectively feeding water or air into the main line.

An equally rapid filling and venting is accomplished by connecting the combination valve to the auxiliary tank.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
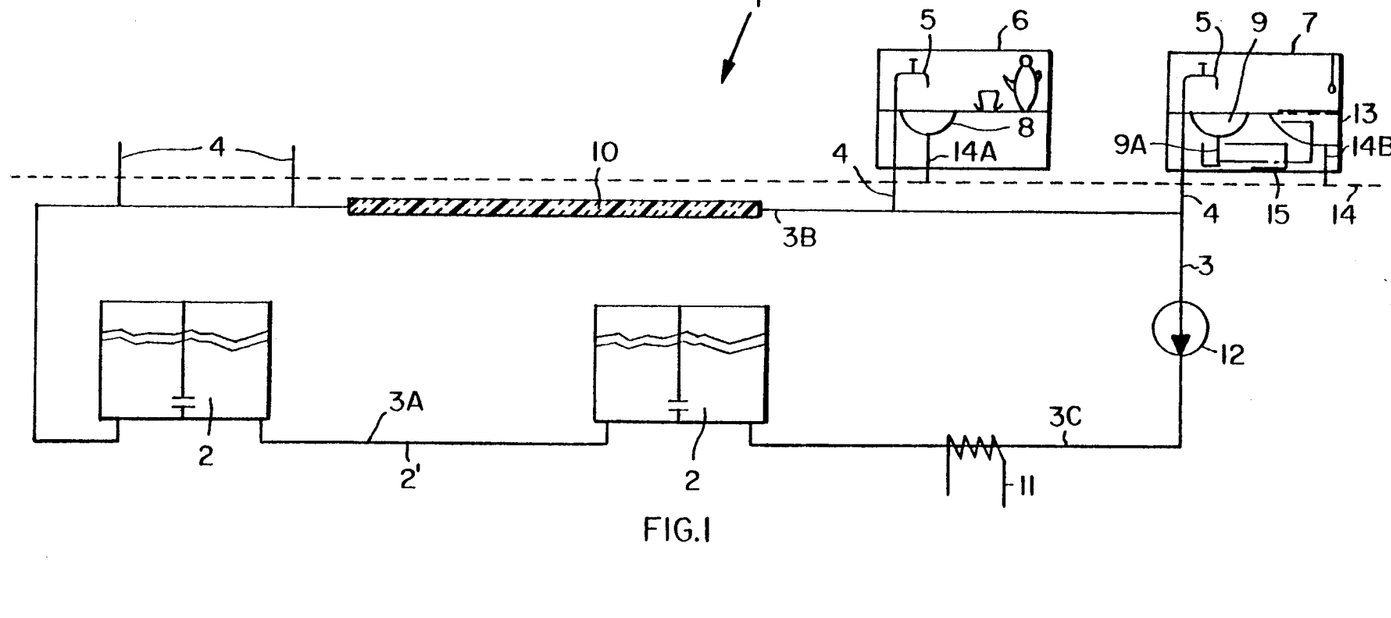
FIG. 1 is a simplified diagram of one embodiment of a fresh water supply system according to the invention with a ring conduit forming the main line.

FIG. 1 shows a fresh water supply and distribution system 1 comprising at least one or two fresh water supply tanks 2. FIG. 1 actually shows two such tanks 2. A main line 3 is constructed as a ring conduit having several sections 3A, 3B, and 3C. Branch lines 4 lead to water taps or faucets 5, for example, in a kitchen 6 or in a toilet 7. The faucet 5 in the kitchen is arranged above a kitchen sink 8. The faucet 5 in the toilet is arranged above a hand wash basin 9. At least a portion of the ring conduit 3, for example, the portion 3B to which the branch lines 4 are connected, is provided with heat insulation 10.

A heater 11, for example, an electrical heater, which heats part of the ring conduit section 3C tempers the water before it enters into the tanks 2. A pump 12 circulates the water in the ring conduit of the main line 3. Heater 11 may be rather small.

Figure 2:
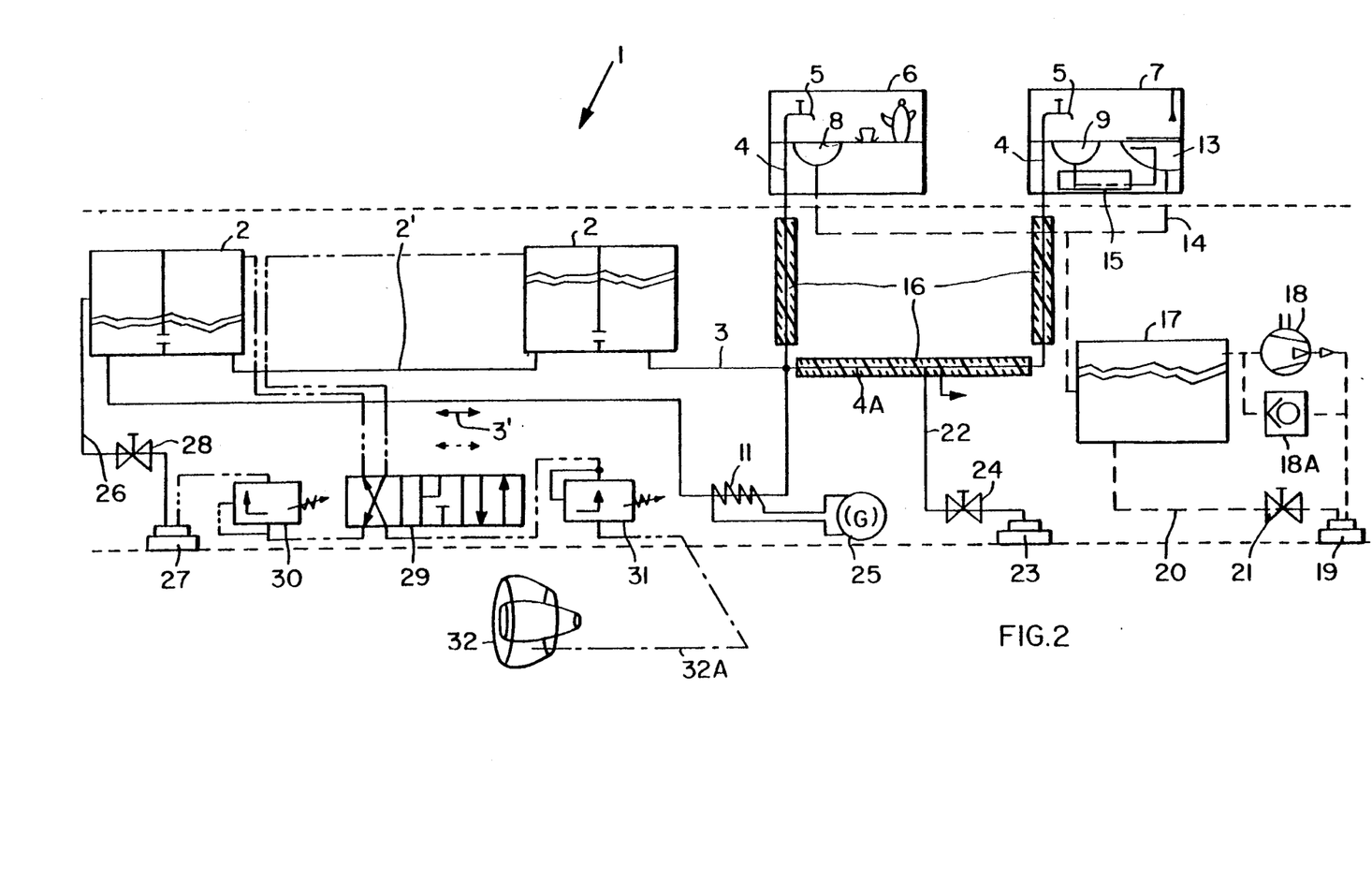
FIG. 2 is an embodiment in which a ring conduit type main line is connected to a source of air pressure or suction through a respective valve so that the water can flow in the main line in one or the other direction.

The kitchen sink 8 and the toilet basin 13 are connected through discharge pipes 14A and 14B to a waste water duct 14 leading to a waste water collection tank shown at 17 in FIG. 2. The basin 9 in the toilet 7 is connected through a discharge pipe 9A into a waste water tank 15. The water in the waste water tank 15 is used for flushing the toilet basin 13. As long as there is sufficient waste water in the tank 15, a separate supply of water for flushing the toilet basin 13 is not necessary. However, the supply of water for flushing the toilet basin 13 may also or instead be connected to the main line 3. The arrangement may be such that toilet flushing may take place either out of the waste water tank 15 or out of the main line 3 depending on the filling level in the waste water tank 15. In order to avoid an overflow in the waste water tank 15, the latter may be provided with an overflow discharge port or an automatic flushing of the toilet may take place in response to a certain filling level within the waste water tank 15.

FIG. 2 shows an embodiment in which individual branch lines are provided with heat insulation 16. The waste water discharge duct 14 is connected to a waste water tank 17 which in turn is connected to a suction pump 18 for producing and maintaining a reduced pressure inside the volume of the waste water tank 17. The pressure side of the suction pump 18 is connected to an evacuation port 19, for example, in the body wall of an aircraft. The evacuation port 19 is also connected through a waste water discharge line 20 and a valve 21 to the tank 17 for emptying on the ground. A non-return valve 18A is connected in parallel to the suction pump 18. A draining port 23 is connected through a drainage line 22 and a valve 24 to branch lines 4 and 4A. As mentioned, the branch lines 4 lead to a water faucet 5 in the kitchen 6 and to a water faucet 5 in the toilet 7. The valve 24 permits an intentional draining of these branch lines 4, e.g. for maintenance work.

The heater 11 is constructed as a through flow or instantaneous electrical heater energized by a generator 25. One of the two supply tanks 2 is connected through a supply line 26 with a supply port 27 through a valve 28. The supply port 27 may also be constructed for venting the tanks 2 as well as for permitting air entry into these tanks. The valve 28 prevents an unintended discharging of the content of the tanks 2.

Both supply tanks 2 are connected to a combination valve 29 for permitting a water flow or circulation through the tanks 2 and the ring conduit or main line 3 in either direction. A pressure limiter 30 is arranged between the supply port 27 and one port of the combination valve 29. Another port of the combination valve 29 is connected to a pressure reducer 31 which in turn leads through a line 32A to a water tap 32, such as a drinking fountain. The combination control and venting valve 29 operates to alternately pressurize one of the tanks and then the other and vice versa so that a flow direction reversal is achieved in the ring conduit or main line 3 as indicated by the arrow 3'. Valve 29 is connected to a suction or pressurizing device not shown.

Figure 3:
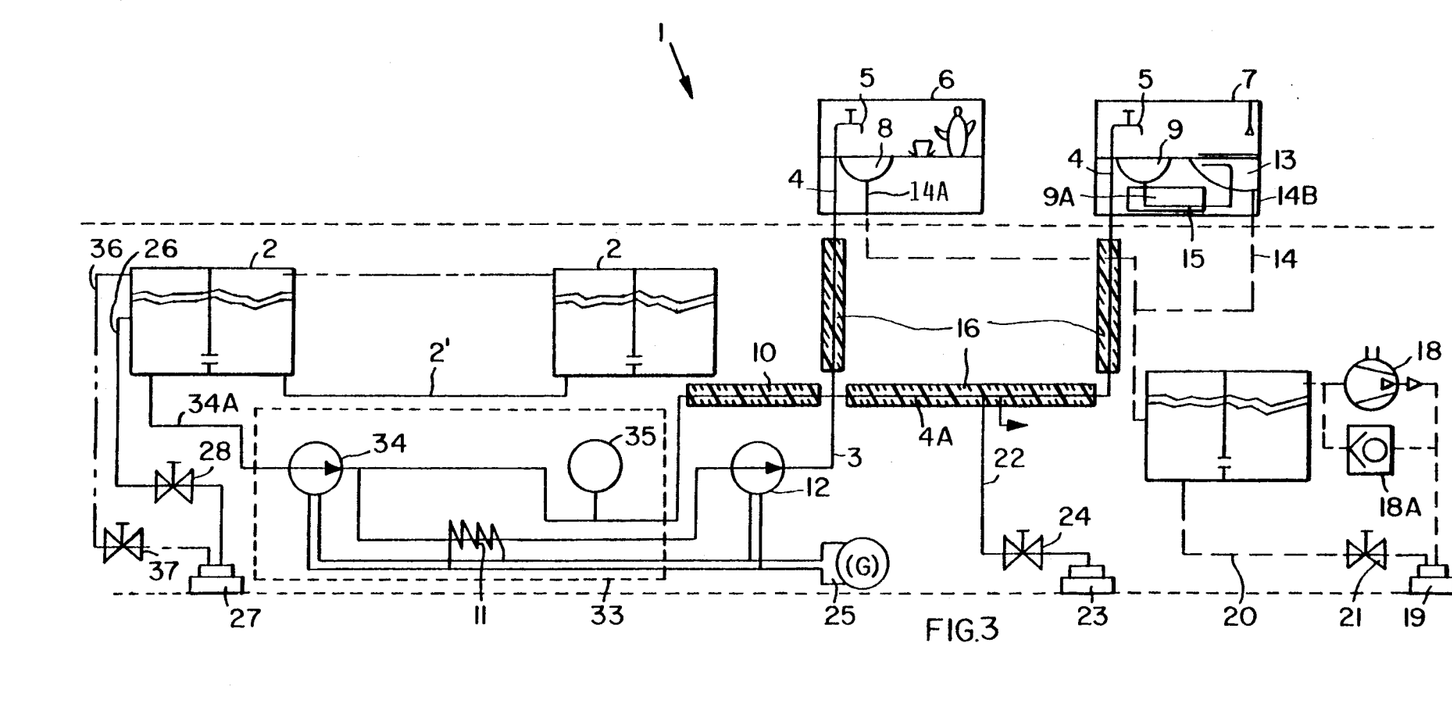
FIG. 3 is a view similar to that of FIG. 2, however, providing a pump in the ring conduit to cause the required water flow.

Referring to FIG. 3, the suction or pressurizing device switched on by the combination valve 29, has been replaced by a water circulating pump 12 and by a further pump 34 to be described below. A hot water automat 33 heated by the through flow heater 11 is connected to the ring main line 3. The pump 34 forms part of the hot water automat 33 which also comprises a pressurized tank 35. The pump 34 feeds water from the tank 2 through the main line 3. In this embodiment the tanks 2 are not connected in series into the main line 3, rather the tanks 2 are connected to the main line 3 through a pipe 34A leading to the suction inlet of the pump 34, the motor of which is driven by a power source 25. The tanks 2 are interconnected by a pipe 2'. The two pumps 12 and 34 can be combined into a single pump unit. The tanks 2 are substantially not pressurized, but the pressurized tank 35 assures a uniform pressure in the ring line 3 independently of the water level in any of the tanks 2. The pressurized tank 35 has, for example, a volume of 20 liters which has been found to be sufficient. However, other desirable volumes for the pressurized tank 35 may be used. The tanks 2 are vented through a venting duct 36 connected through a valve 37 to a filling or supply port 27 as mentioned above. The filling port 27 is connected through the filling pipe 26 and a valve 28 to the tank 2. The branch lines 4 and the main ring line 3 can, for example, be emptied by introducing a pressurized gas or by applying suction to these lines. Where the installation provides for a drainage by gravity flow, the tanks and lines may be emptied by such gravity flow. Alternatively, the tanks 2 may be emptied by suction or by blowing.

Instead of using a single loop main line 3 as shown in FIGS. 1, 2, and 3, a plurality of ring lines or loops may be used and arranged in a matrix type structure. Depending on the arrangement of such a matrix structure, one or several water conveying devices for the fresh water may be provided. Further, the tanks may either be integrated into the loops, or at least into one loop or they may be connected through branch lines as shown at 34A in FIG. 3. Similarly, faucets, taps and the like may be connected through branch lines 4 to the main line 3 or these taps and faucets may be connected directly into the main line by respective pipe couplings, thereby forming an integral component of the main line 3.

Instead of constructing the heater 11 as an automatic through flow heater, an immersion heater may be used in one or both tanks. Also, a heat exchanger could be connected to the tanks instead of a through flow heater and instead of an immersion heater. The heat exchanger could be operated with waste heat from the cabin. The fresh water flow may be maintained by one of the three above mentioned possibilities, namely the pump 12 or an alternating pressurization and evacuation or even by gravity flow.

Figures 4, 5:
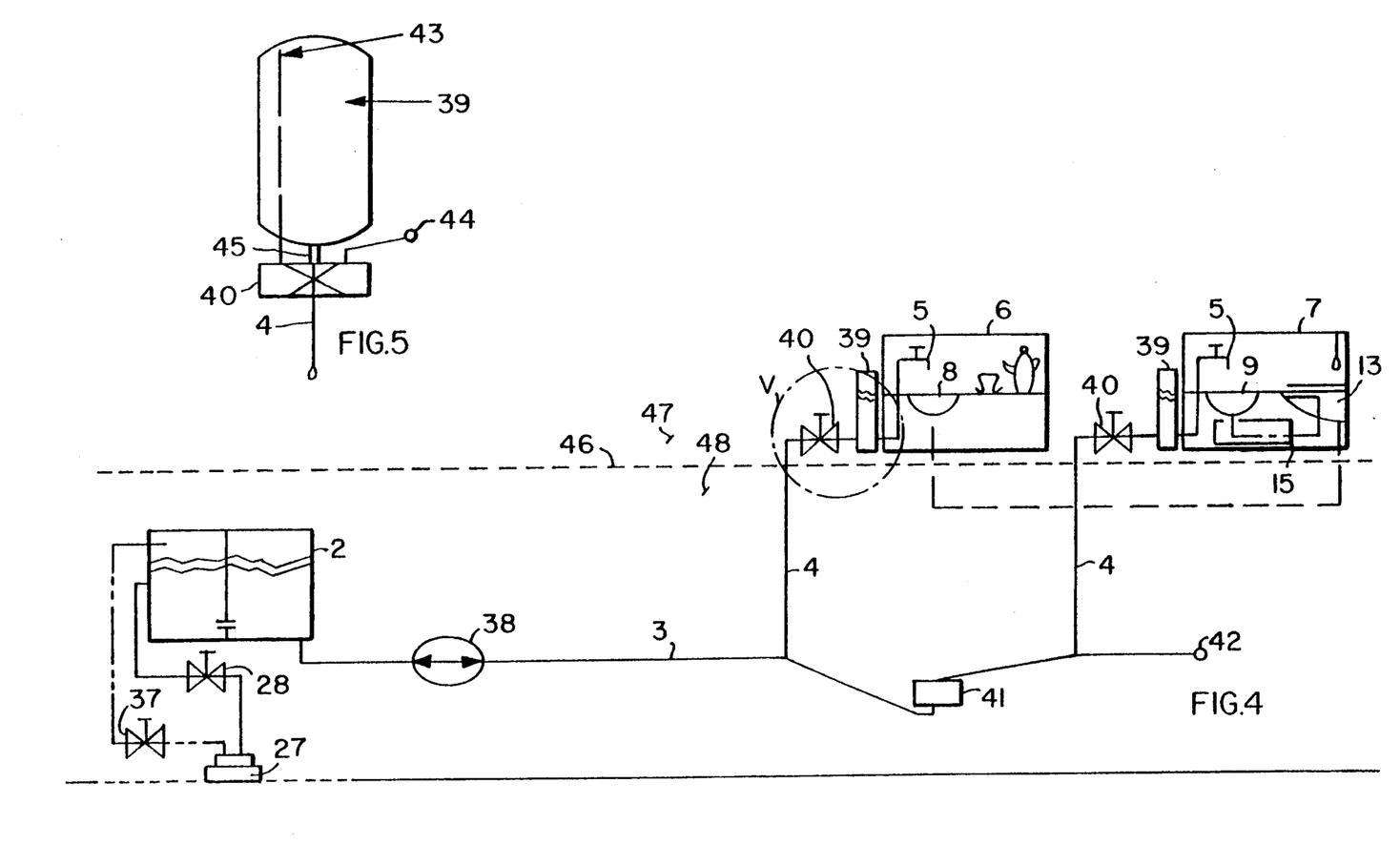
FIG. 4 is a block diagram of a water supply system with a main line in which the flow direction can be reversed.
FIG. 5 shows on an enlarged scale the detail V in FIG. 4, illustrating an auxiliary water tank and a combination valve.

In the embodiment of FIG. 4, the main line 3 is not a ring conduit. Rather, it is constructed as a simple connecting line provided with a conveying device 38 which is a pump capable of transporting the water either in one direction or in the opposite direction, depending on the direction of rotation of the pump by its electric motor, which is respectively controlled by a control device. Instead of the pump 38, a pressurizing compressor or an evacuating pump may be connected to the tank or tanks 2. The water faucets 5 are connected to the main line 3 through auxiliary water tanks 39, and through combination valves 40. The combination valves 40 are connected through branch lines 4 to the main line 3. A collection tank is preferably arranged between two connecting points of two branch lines 4 to the main line 3. A coupling device 42 connects a further water user to the system. The use of collection tanks 41 which are connected to the supply tank 2 is especially useful in large capacity aircraft.

FIG. 5 shows the detailed construction of the auxiliary water tank 39 and of the combination valves 40. The auxiliary tank 39 is constructed so that a venting pipe 43 reaches into the tank 39. The venting pipe 43 is connected with the combination valve 40. The combination valve 40 has one port 44 opened to the environment, whereby atmospheric air is supplied when the branch line 4 is being emptied or when the auxiliary tank 39 is being emptied. Similarly, when the branch line and the auxiliary tank are refilled, air displaced by the reentering water is also discharged to the atmosphere through the port 44. The combination valve 40 is connected to the auxiliary tank 39 through a connecting pipe 45.

FIG. 4 shows a floor at 46 which separates a cabin 47 above the floor from a space 48 below the floor 46 to illustrate the installation of the present system.

Figures 6, 7:
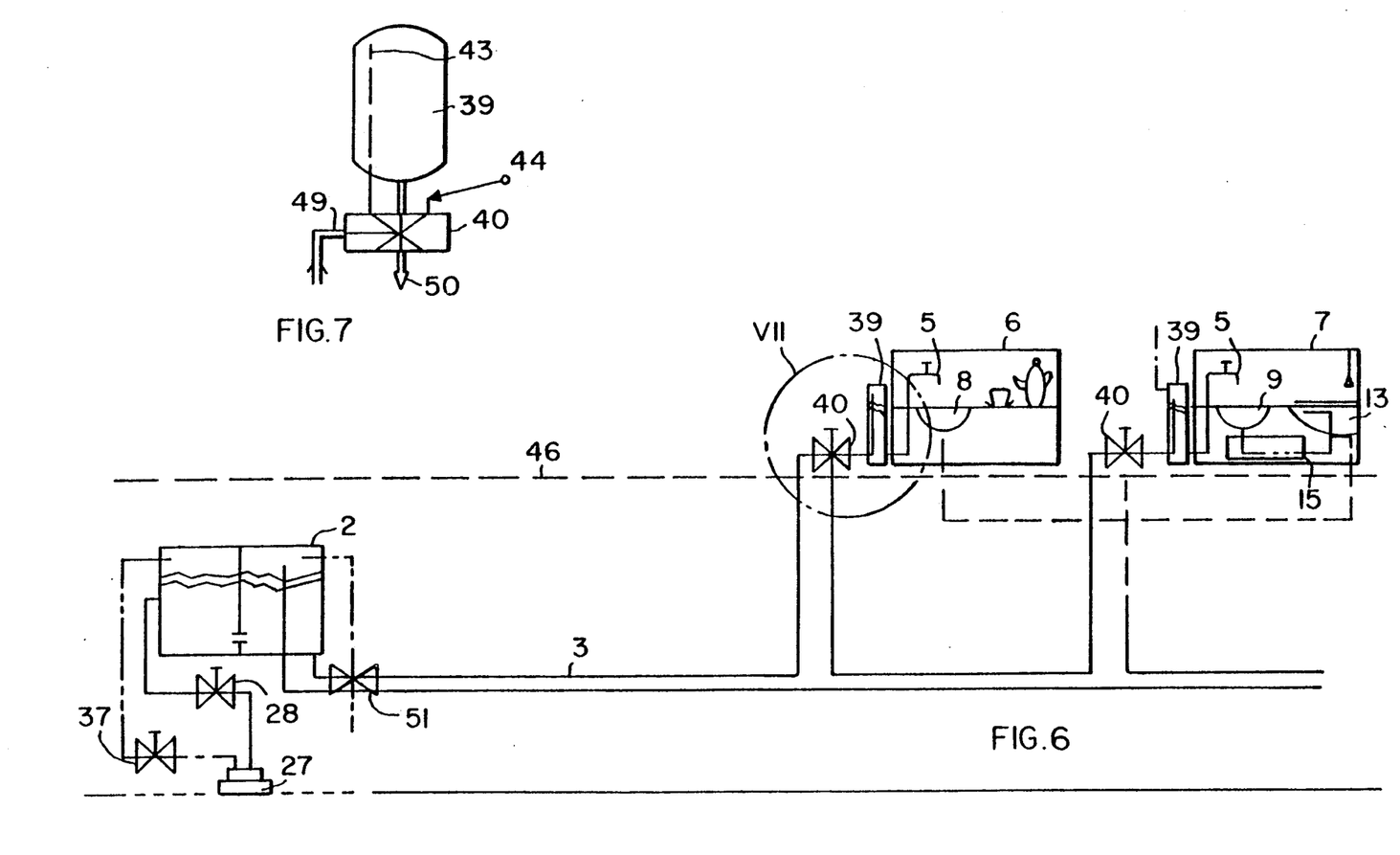
FIG. 6 is a block diagram of a water supply system with a ring conduit into which control valves are integrated for the auxiliary water tanks arranged near the water taps.
FIG. 7 is an enlarged illustration of the detail VII in FIG. 6, showing the integration of the combination valve into the ring conduit.

FIG. 6 shows an embodiment in which the main line 3 is constructed as a ring conduit into which the combination valves 40 are integrated. The details of such integration are shown in FIG. 7. The combination valves 40 have an inlet port 49 as well as an outlet port 50. Otherwise, the construction of FIG. 6 is substantially the same as the embodiment shown in FIG. 5. A main combination valve 51 is connected to the main line 3 for selectively introducing water or air into the main line 3.

In order to avoid a freeze-up when water is introduced into the empty main line, a heater may be provided to heat the water in the tank 2 or instead of heating the tank 2 it is possible to introduce hot air into the main line prior to introducing water into the main line.

Figures 8, 9, 10:
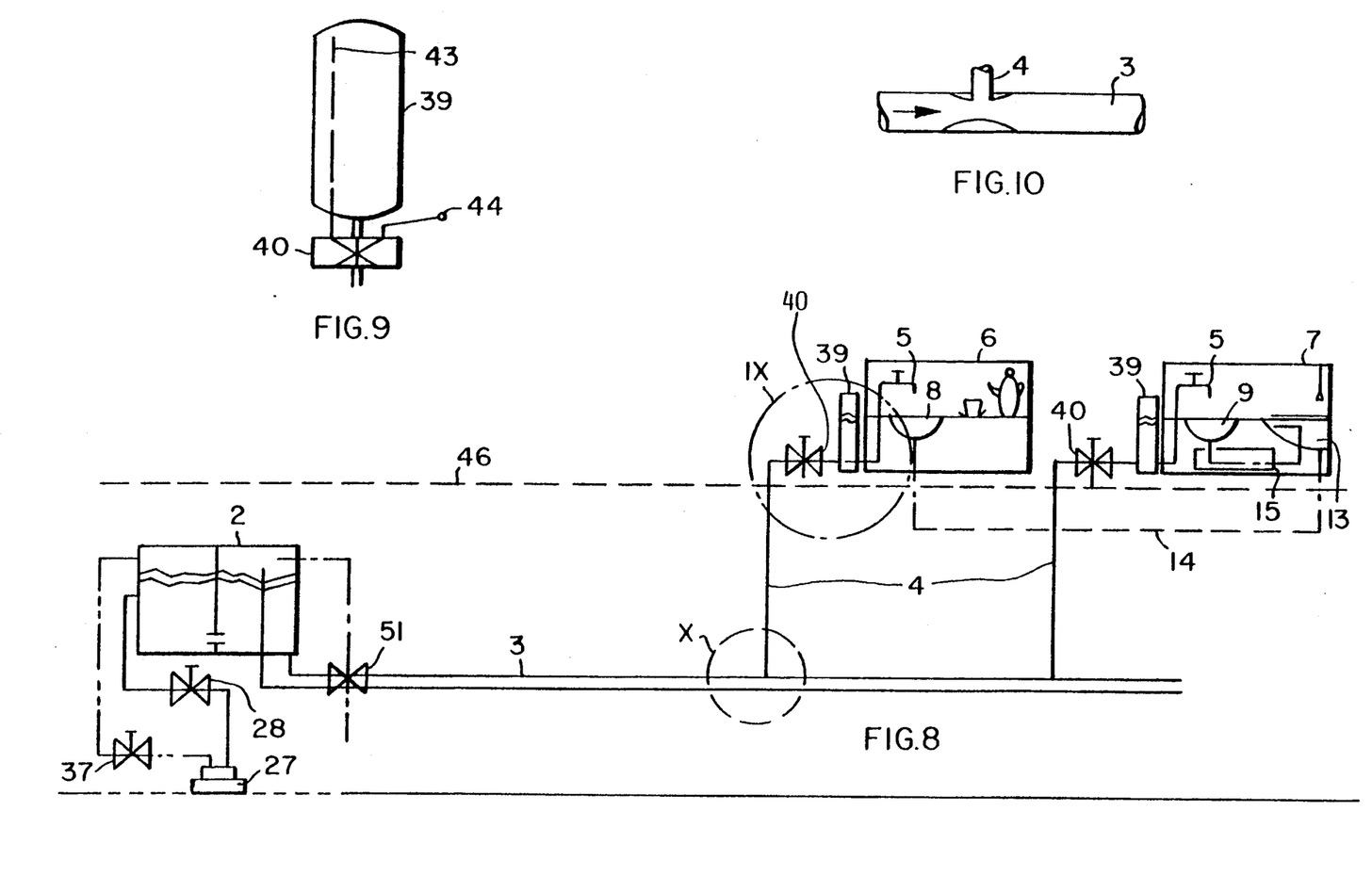
FIG. 8 illustrates a fresh water supply system in which a ring conduit is equipped with a combination valve and in which controllable valves provided individually for each auxiliary water tank, are connected in branch lines leading to the tanks and connected to the ring conduit.
FIG. 9 is an enlarged illustration of the detail IX in FIG. 8, showing a combination valve and an auxiliary tank.
FIG. 10 is an enlarged illustration of the detail X in FIG. 8, showing the connection of a branch line to the ring conduit main line.

Rather than integrating the combination valves 40 into the main line as shown in FIG. 6, another embodiment shown in FIG. 8 illustrates the arrangement of branch lines 4. The connection of the branch lines 4 to the main line 3 is illustrated in detail in FIG. 10. The discharge or emptying of the branch lines 4 takes place in accordance with the venturi principle.

FIG. 9 illustrates the connection of the combination valve 40 with the auxiliary tank or reservoir 39. This construction corresponds substantially to the embodiment shown in FIG. 5.

Although the invention has been described with reference to specific example embodiments it will be appreciated that it is intended to cover all modifications and equivalents within the scope of the appended claims.

What we claim is:

1. A fresh water supply system in an aircraft, comprising at least one fresh water supply tank (2), at least one water tap (5), a main line (3) interconnecting said supply tank (2) and said water tap (5), water conveying means connected to said system for transporting water, a fresh water auxiliary tank (39) arranged in a vicinity of said water tap (5), a controllable first combination valve (40) connecting said auxiliary tank to said main line (3) near said water tap, control means connected to said water conveying means for controlling a water flow through said main line (3) during first time durations, said first combination valve (40) being connected to said main line (3) and responsive to said control means for venting said main line and said auxiliary tank (39), for permitting feeding pressurized air into at least portions of said system during second time durations between said firs time durations, said system further comprising a controllable second combination valve (51) connected to said main line (3) for feeding water into said main line (3) only during said first time durations and for feeding pressurized air into said main line (3) only during said second time durations in response to said control means, whereby said first and second combination valves (40 and 51) are controlled by said control means so that said main line is filled with water only during said first time durations when water is used and filled with air only during said second time durations for preventing freeze-up of said main line in said aircraft.

2. The fresh water supply system of claim 1, further comprising water heating means arranged for heating water flowing in said main line near said supply tank at least during said first time durations.

3. The water supply system of claim 1; further comprising means for feeding hot air through said main line during said second time durations at least prior to feeding water through said main line.

4. The water supply system of claim 1, wherein said water conveying means comprise a pump and a motor for driving said pump in one or the opposite direction for feeding water through said main line in one or the opposite direction during said first time durations.

5. The water supply system of claim 1, wherein said water conveying means comprise an air pump connected to said system for conveying water by pressurizing or applying suction to said main line during said firs time durations.

6. The water supply system of claim 1, wherein at least sections of said main line are arranged for conveying water through said main line by gravity flow during said first time durations.

7. The water supply system of claim 1, wherein said main line comprises several sections, at least certain sections forming a ring conduit through which water flows only through said first time durations.

8. The water supply system of claim 1, further comprising at least one branch line for connecting said water tap to said main line, and air suction means connected to said branch line for removing air prior to feeding water during said first time durations.

9. The water supply system of claim 1, wherein said control means comprise means for sensing a water level in said auxiliary tank (39) for ascertaining a minimal water level in said auxiliary tank to provide a respective control signal, said water conveying means being responsive to said control signal for filling all auxiliary tanks independently of said first and second time durations.

* * * * *

UNITED STATES PATENT AND TRADEMARK OFFICE
CERTIFICATE OF CORRECTION

PATENT NO. : 5,303,739

DATED : April 19, 1994

INVENTOR(S) : Ellgoth et al.

It is certified that error appears in the above-identified patent and that said Letters Patent is hereby corrected as shown below:

In column 1, above "FIELD OF THE INVENTION" insert the following paragraph: --CROSS REFERENCE TO RELATED APPLICATIONS The present application relates to U. S. Patent Application Serial No.: 07/954,892, filed on September 30, 1992, ; and U. S. Patent Application Serial No.: 07/954,896, filed on September 30, 1992, Column 7, line 7, replace "firs" by --first--;

Column 8, line 6, replace "firs" by --first--.

Signed and Sealed this

Sixth Day of September, 1994

*Attest:*

BRUCE LEHMAN

*Attesting Officer*    *Commissioner of Patents and Trademarks*